US010947995B1

United States Patent
Thomassin et al.

(10) Patent No.: US 10,947,995 B1
(45) Date of Patent: Mar. 16, 2021

(54) FAN NOSE CONE AND DYNAMIC TUNING OF AIRCRAFTS

(71) Applicant: PRATT & WHITNEY CANADA CORP., Longueuil (CA)

(72) Inventors: Jean Thomassin, Sainte-Julie (CA); Lena Raykowski, Mississauga (CA); Gilles Begin, Longueuil (CA); Ahmed Abdelrahman, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/583,995

(22) Filed: Sep. 26, 2019

Related U.S. Application Data (60) Provisional application No. 62/892,156, filed on Aug. 27, 2019.

(51) Int. Cl.
*F04D 29/66* (2006.01)
*B64C 11/14* (2006.01)

(52) U.S. Cl.
CPC ............ *F04D 29/668* (2013.01); *B64C 11/14* (2013.01)

(58) Field of Classification Search
CPC .................................. F04D 29/668; B64C 11/14
See application file for complete search history.

(56) References Cited

U.S. PATENT DOCUMENTS

| | | | | |
|---|---|---|---|---|
| 4,042,070 A * | 8/1977 | Flannelly | ............... | B64C 27/001 188/379 |
| 4,724,923 A * | 2/1988 | Waterman | ............... | F16F 15/03 181/208 |
| 5,256,031 A * | 10/1993 | Bothien | ................ | F04D 29/668 415/1 |
| 5,431,261 A * | 7/1995 | Olgac | ................... | F16F 7/1005 188/379 |
| 5,641,133 A * | 6/1997 | Toossi | ................... | B64C 27/001 244/117 R |
| 6,375,118 B1 * | 4/2002 | Kibens | .................... | F02K 1/827 244/53 R |
| 6,494,679 B1 * | 12/2002 | Gadre | ....................... | F01D 5/24 416/145 |
| 7,306,432 B2 * | 12/2007 | Rockarts | ................. | G01M 1/32 416/144 |
| 8,322,991 B2 * | 12/2012 | MacFarlane | .......... | F04D 29/662 416/144 |
| 9,217,331 B1 | 12/2015 | Yellapragada et al. | | |
| 9,879,698 B2 * | 1/2018 | Burkholder | ............... | F02C 7/04 |
| 9,970,298 B2 * | 5/2018 | Le Strat | .............. | F16B 23/0038 |

(Continued)

*Primary Examiner* — Michael Lebentritt
(74) *Attorney, Agent, or Firm* — Norton Rose Fulbright Canada LLP (57) ABSTRACT

A method for tuning a vibration response of an aircraft system is disclosed, where the aircraft system comprises an airframe and at least one engine dynamically coupled, the at least one engine having an engine rotor including a nose cone. The method comprises obtaining a range of frequencies associated with at least one resonance mode of the aircraft system and adding mass within the nose cone to offset at least one dominant excitation frequency of the turbofan engine outside the range of frequencies associated with the at least one resonance mode of the aircraft system. A method of tuning dynamic coupling of an aircraft system comprising an airframe and an engine mounted thereto is also disclosed.

20 Claims, 4 Drawing Sheets

(56) References Cited

U.S. PATENT DOCUMENTS

| | | | |
|---|---|---|---|
| 2011/0147512 A1* | 6/2011 | Cranga | B64C 27/001 |
| | | | 244/17.27 |
| 2011/0259093 A1* | 10/2011 | Gerez | G01H 1/003 |
| | | | 73/112.01 |
| 2013/0257053 A1* | 10/2013 | Russ | H02K 5/20 |
| | | | 290/52 |
| 2017/0009601 A1* | 1/2017 | Szwedowicz | F01D 25/06 |
| 2018/0017071 A1 | 1/2018 | Hall | |
| 2019/0106203 A1* | 4/2019 | Bennett | B64D 27/26 |
| 2020/0130814 A1* | 4/2020 | Therien | B64C 13/503 |

* cited by examiner

FIG. 1

Obtaining a range of frequencies associated with at least one resonance mode of the aircraft system

↓

Adding mass within the nose cone to offset at least one dominant excitation frequency of the turbofan engine outside the range of frequencies associated with the at least one resonance mode of the aircraft system

FIG. 3

Obtaining operational frequencies of the aircraft system, including at least one dominant frequencies range

↓

Determining a target resonant frequency of the turbofan engine different from that of the at least one dominant frequencies range of the aircraft system

↓

Modifying a mass of the nose cone to achieve said target resonant frequency of the turbofan engine

FIG. 4

FAN NOSE CONE AND DYNAMIC TUNING OF AIRCRAFTS

CROSS-REFERENCE TO RELATED APPLICATIONS

The present application claims priority on U.S. Patent Application No. 62/892,156 filed Aug. 27, 2019, the entire content of which is incorporated herein by reference.

TECHNICAL FIELD

The application relates generally to optimization of vibration behaviour of aircrafts and, more particularly, to methods for tuning dynamic coupling of turbofan engines and aircrafts.

BACKGROUND OF THE ART

During normal operating conditions of an aircraft, vibratory phenomenon are generated, for instance via relative movements between moving and/or assembled components of the aircraft, such as rotating components of engines, and/or via aeroelastic effects on the aircraft. During certification of an aircraft, the dynamic behaviour of aircrafts including the airframe and engines, such as turbofan engines, is typically characterized. Incompatibilities in dynamic coupling between an aircraft and engine(s) may affect the overall performance, stability and/or durability of aircraft components(s) or the aircraft as a whole, and/or affect the comfort of occupants of the aircraft during normal operating conditions of the aircraft, such as during flight.

SUMMARY

In one aspect, there is provided a method for tuning a vibratory response of an aircraft system comprising an airframe and at least one turbofan engine dynamically coupled, the at least one turbofan engine having an engine rotor including a nose cone, the method comprising: obtaining a range of frequencies associated with at least one resonance mode of the aircraft system; and adding mass within the nose cone to offset at least one dominant excitation frequency of the turbofan engine outside the range of frequencies associated with the at least one resonance mode of the aircraft system.

In another aspect, there is provided a method of tuning dynamic coupling of an aircraft system comprising an airframe and a turbofan engine mounted thereto, the turbofan engine having an engine rotor including a nose cone, the method comprising: obtaining operational frequencies of the aircraft system, including at least one dominant frequencies range; determining a target resonant frequency of the turbofan engine different from that of the at least one dominant frequencies range of the aircraft system; and modifying a mass of the nose cone to achieve said target resonant frequency of the turbofan engine.

In a further aspect, there is provided a method for tuning a dynamic coupling of an airframe and a turbofan engine of an aircraft system, the turbofan engine mounted to the airframe, the turbofan engine having at least one resonant frequency, the method comprising: obtaining an aircraft system vibratory response, the aircraft system vibratory response defining a range of operational frequencies of the aircraft system, the turbofan engine having an fan and a baseline nose cone removably attached thereto; removing the baseline nose cone from the fan of the turbofan engine; and mounting a tuned nose cone to the fan of the turbofan engine in place of the baseline nose cone, the tuned nose cone having a mass greater than that of the baseline nose cone or a mass distribution different from that of the baseline nose cone to modify the at least one resonant frequency.

DESCRIPTION OF THE DRAWINGS

Reference is now made to the accompanying figures in which.

DETAILED DESCRIPTION

Figure 1:
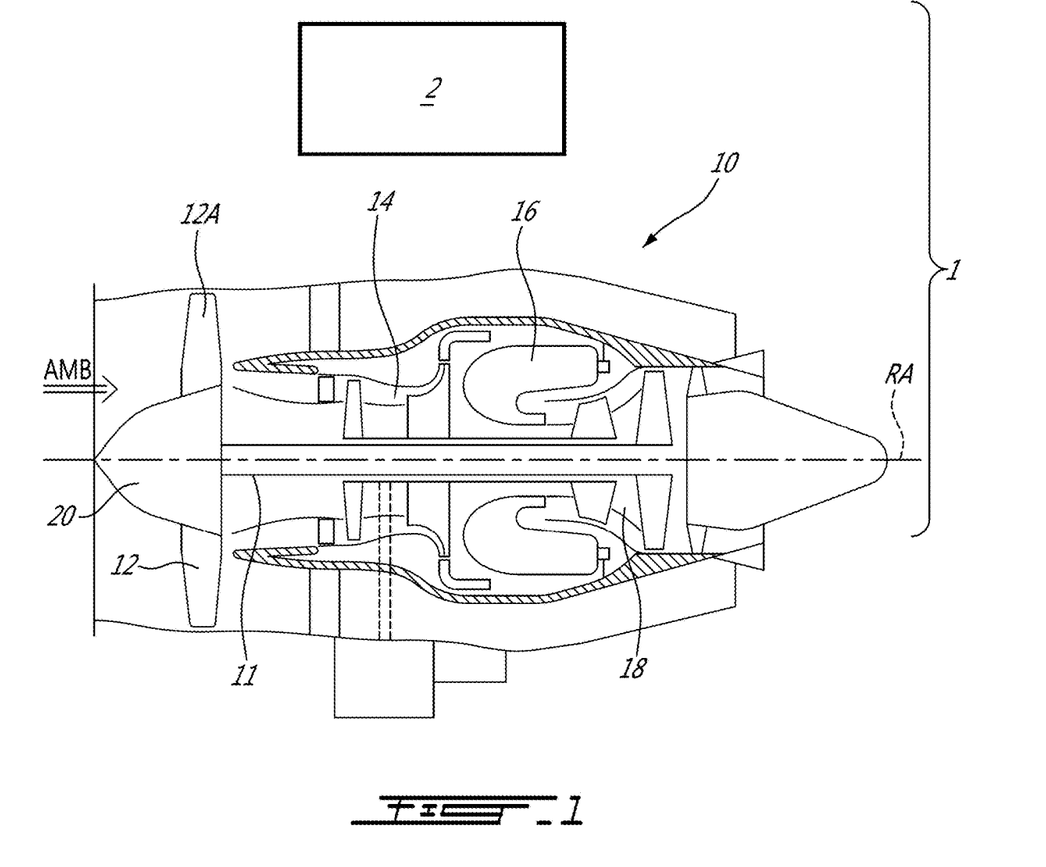
FIG. 1 is a schematic cross-sectional view of a turbofan engine.

FIG. 1 illustrates a gas turbine engine 10 of a type preferably provided for use in subsonic flight, generally comprising in serial flow communication a fan 12 through which ambient air is propelled, a multistage compressor section 14 for pressurizing the air, a combustor 16 in which the compressed air is mixed with fuel and ignited for generating an annular stream of hot combustion gases, and a turbine section 18 comprising one or more turbines for extracting energy from the combustion gases. The gas turbine engine 10 may be suitable for use in aircraft applications. More particularly, as illustrated, the gas turbine engine 10 is a turbofan engine. The gas turbine engine 10 comprises a central axis of rotation RA about which one or more spools of the gas turbine engine 10 may rotate. In some embodiments, central axis of rotation RA may also correspond to (i.e., be coaxial with) a rotation axis of the fan 12. The gas turbine engine 10 is schematically shown as part of an aircraft system 1, which includes an airframe and which may include one or more of the engine(s) 10 dynamically coupled, as will be described later.

The turbofan engine 10 includes an engine rotor 11, in one or more sections, and/or a plurality of engine rotors 11. The fan 12 may be considered part of the engine rotor 11. The fan 12 is driven by an engine shaft (or simply the "engine rotor 11") for rotation therewith about the rotation axis RA. The fan 12 comprises a plurality of circumferentially distributed fan blades 12A, which may extend from a fan hub (not shown). The fan 12 may be disposed at or near an inlet of the gas turbine engine 10 and may be considered an inlet fan. The fan 12 may be considered as part of the compressor section 14. The fan blades 12A may be arranged as a circular array of radially extending fan blades 12A in driving engagement with the engine rotor 11, such as by being secured to the fan hub. As shown in FIG. 1, the gas turbine engine 10 comprises a nose cone 20. The nose cone 20 is mounted to the fan 12, such as to be located upstream of the fan hub, for instance, and coaxial therewith. The nose cone 20 projects axially beyond the fan blades 12A. In other words, the nose cone 20 extends axially upstream of the fan blades 12A. In some embodiments, the nose cone 20 may be secured to the fan hub for common rotation therewith. The nose cone 20 may also be referred to as "inlet cone" or "fan spinner" of the gas turbine engine 10. The nose cone 20 may be integrally formed with the hub 12B as a unitary construction, or the nose cone 20 may comprise a separately formed component or components (e.g., removably) secured individually or as an assembly to the fan hub according to any suitable method such as by a plurality of circumferentially-distributed fasteners (not shown).

Figure 2:
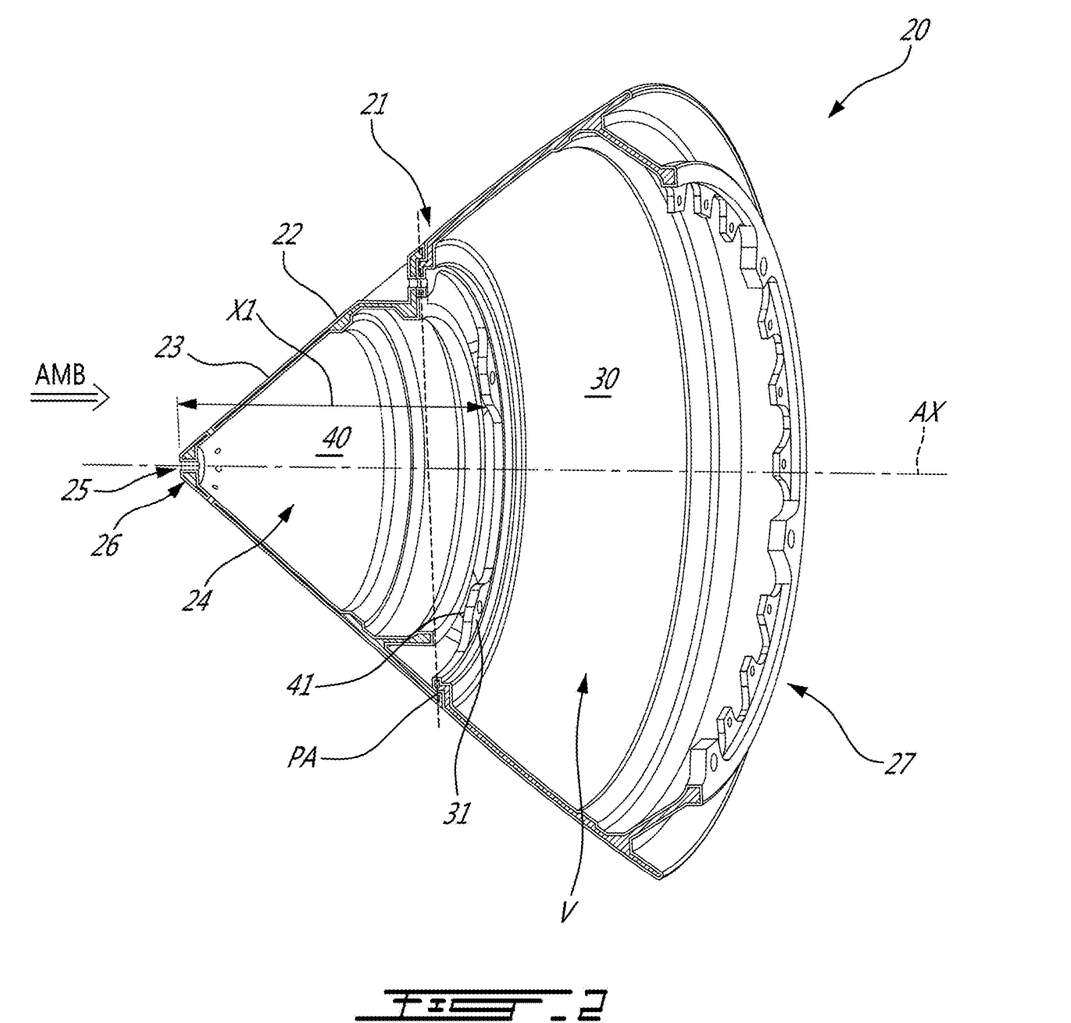
FIG. 2 is a cross-sectional perspective view of an exemplary nose cone as used in the turbofan engine of FIG. 1.

FIG. 2 illustrates an exemplary nose cone 20 according to an embodiment. There is shown a cross-section of the nose cone 20 taken along a central axis AX of the nose cone 20. The nose cone 20 has a conical body 21 including an outer wall 22 defining an outer surface 23 of the nose cone 20 for interfacing with a free stream of ambient air AMB (e.g., ram air) entering the gas turbine engine 10 during flight or other mode(s) of operation of the gas turbine engine 10. The outer surface 23 circumscribes (or defines a periphery of) a volume V of the nose cone 20.

The nose cone 20 defines an interior (i.e., an internal volume/space), which may also be referred to as a nose cone cavity 24, at least partially enclosed by the outer wall 21. In the depicted embodiment, the outer wall 21 is thin over a substantial portion of the outer wall 21, and therefore it could be referred to as a nose cone shell. As such, the nose cone volume may maximize an internal space (or simply stated, the nose cone cavity 24), which may in turn minimize the overall nose cone 20 weight. While it may be advantageous to minimize the nose cone weight, as is the normal trend for aviation applications, adding mass within the volume of the nose cone 20 may be desirable to place the engine rotor 11 resonance in an optimal frequency range. In other words, adding mass within the volume of the nose cone 20 may allow to adjust the natural frequencies (at least one, or more) of the gas turbine engine 10. These and other aspects resulting from adding mass in the nose cone 20 are further discussed later.

With continued reference to FIG. 2, the depicted nose cone cavity 24 is in fluid communication with the free stream of ambient air AMB entering the gas turbine engine 10, such as by one or more air inlet(s) 25 defined at the apex 26 of the nose cone 20, as one possibility. Other configurations of the nose cone 20 may be contemplated, whether or not allowing fluid communication between the nose cone cavity 24 and the ambient air AMB upstream of the nose cone 20 and entering the gas turbine engine 10, though fluid communication between the nose cone cavity 24 and the ambient air AMB upstream of the nose cone 20 may be desirable in most cases.

In the depicted embodiment, the nose cone 20, more specifically the nose cone body 21, is made of at least two separate components, which defines a base section 30 and a tip section 40 of the nose cone 20. This is only one possibility, as the nose cone body 21 may be formed of a single part, from the apex 26 to the fan hub (or equivalent) junction end 27 of the nose cone 20. The tip section 40 defines the tip or apex 26 of the nose cone 20. As shown, the base section 30 includes a connection interface at a junction end 27 (or simply the axial end) of the nose cone 20, which may be configured for connection with the fan hub (or equivalent) or other component(s) of the engine rotor 11. As shown, the base section 30 and the tip section 40 have interfacing flanges 31, 41 located about their respective circumference and configured to interconnect the base section 30 and the tip section 40 to each other, via fasteners (not shown), or otherwise. The tip section 40 extends from the apex 26 to an axial distance X1 from the apex 26. Such axial distance X1 is defined between the apex 26 and the junction end 27 of the nose cone 20. In the depicted embodiment, the axial distance X1 corresponds to the interfacing flange 41. The base section 30 and the tip section 40 may thus be removably connected to each other, as opposed to forming a single rigid part. When assembled together the base section 30 and the tip section 40 may form a continuous outer surface 23 of the nose cone 20, defining the nose cone "jacket" or periphery, which circumscribes the nose cone volume.

Aircraft certification typically involves characterizing the dynamic behaviour of the aircraft, or stated differently the aircraft system 1 vibration response, including an airframe 2 with engines, such as gas turbine engines 10, mounted thereon. The dynamic behaviour of an aircraft system 1 comprising one or more turbofan engine 10 can be determined using any suitable techniques, such as, without limitation, via ground vibration testing (GVT), which generally consist in defining the elastic and inertial characteristics of the aircraft system 1. Prior of after performing such testings, an analytical model may be conceived. Determining the aircraft system 1 vibration response may allow to identify the aircraft system 1 critical resonances, which are associated with dominant frequencies (or dominant frequencies ranges) of the aircraft system. The airframe 2 and engines 10 may be considered as an aircraft system 1 and the dynamic response of such aircraft system 1 may be optimized. In other words, during certification or post-certification, tuning of the dynamic coupling of the turbofan engine(s) 10 and aircraft (or together simply the "aircraft system 1") may be desirable.

During operation of the turbofan engine 10, frequencies are generated, due for instance to the rotation of the engine rotor 11, aeroelastic effects, reciprocal motions of moving parts of the turbofan engine 10, engine balance imperfections or slight misalignments of parts within the turbofan engine 10, as a few examples. These frequencies, hereinafter referred to as excitation frequencies of the turbofan engine 10, may propagate in the whole aircraft system 1, for instance through mounting supports of the engines on the airframe 2, such as through the engine casing/housing to the wings (or aircraft tail) via engine supports. This frequency propagation may be impaired in many suitable ways, such as by adding dampers or other devices for reducing/damping vibrations in the engine supports, and/or by modifying engine components stiffness, such as the engine housing, for examples. Such excitation frequencies are typically evaluated during the engine design and certification process. However, such excitation frequencies may be unsuited to proper dynamic coupling of the engine(s) 10 with the airframe 2.

During or in association with the engine 10 and aircraft certification process, operational frequencies of the aircraft system 1 are obtained. This may allow aircraft systems manufacturers to determine the vibration behaviour of the aircraft system 1. Operational frequencies of the aircraft system 1 may be obtained using any suitable vibration testing techniques, such as, without limitations, GVT as discussed above. With such operational frequencies of the aircraft system 1 obtained, intrinsic vibration characteristics of the aircraft system 1 may be determined. In other words, one may draw a portrait of the aircraft system 1 in the frequency domain, which may be used to validate analytical models of the aircraft systems. Obtaining the operational frequencies of the aircraft system 1 includes identifying one or more dominant frequencies (or dominant frequencies ranges) within the operational frequencies of the aircraft system 1. The dominant frequencies (or dominant frequencies ranges) of the aircraft system 1 may often be associated with one or more main resonance modes of the engine 10. These main resonance modes may correspond to the rotor critical speeds, which include compressor and turbine bounce modes. The one or more dominant frequencies are associated with first order resonance modes of the engine 10. Such one or more dominant frequencies may be visualized on a Campbell diagram, which may also be commonly referred to as "Whirl Maps" diagram. In some embodiments, the one or more dominant frequencies (or dominant frequencies ranges) may be considered as low frequencies (frequencies ranges), for instance lower than 60 Hz. Depending on the dynamic system, the one or more dominant frequencies may however be greater than 60 Hz, in some cases. This may be function of modal characteristics of the dynamic system. The main resonance modes of the engine 10 may be established (obtained) during engine 10 certification and their association with the modes of the aircraft system 1 may be evaluated through a ground vibration test of the aircraft system 1.

It may be desirable to have at least one or more dominant ones of the engine excitation frequencies offset (offset in the frequency domain) or dissociated from at least the one or more main resonance modes of the aircraft system 1. This may prevent or otherwise limit aircraft system 1 dynamic instabilities and/or durability, for instance due to vibrations or portions of the aircraft entering into resonance (e.g. entering momentarily into one or more modes of resonance).

Aircraft systems 1 including at least an airframe 2 and at least one turbofan engine 10 may not be readily compatible dynamically once assembled together right off the manufacture. In other words, dynamic coupling of a specific turbofan engine 10 mounted to a specific airframe 2 may be optimized, which can in turn enhance the performance of the aircraft system 1 as a whole, and/or simply allow the aircraft system 1 to pass the certification processes and meet certification requirements.

Due to engine and aircraft certification process and requirements, modifying engine components to selectively place the engine excitation frequencies in a most desirable place within the aircraft system 1 operational frequencies range, which may be referred to as the vibratory response of the aircraft, may substantially affect design time and expenses. In other words, adjusting the natural frequencies of the turbofan engine(s) 10 may involve re-design of major parts or components of the aircraft and/or the turbofan engine(s) 10, which may result in a major impact on design, testing, certification time and costs. Such re-design may require re-certification of the aircraft system 1, for instance, which may be undesirable. As mentioned above, adding mass in the nose cone 20 will affect (displace or attenuate) the natural frequencies of the engine(s) 10. Adding mass in the nose cone 20 may provide an amplified ability to affect the natural frequencies of the turbofan engine(s) 10 and/or dynamic response of the aircraft system 1 as a whole, due for instance to that location of the added mass within the engine(s) 10, without having to re-design other components of the engine(s) 10, such as the engine housing, as a possibility. This specific area of the turbofan engine 10 is more easily accessible by an aircraft professional than other parts of the turbofan engine 10, such as other portions of the turbofan engine 10 enclosed in a casing and/or parts of the turbofan engine 10 interfacing with the airframe 2.

Tuning the dynamic coupling of the turbofan engine(s) 10 and aircraft as described herein may advantageously be made without having to re-design major parts or components of the aircraft or engine(s) 10. Accordingly, this may optimize a dynamic coupling of an aircraft system 1 without requiring re-certification of the aircraft system 1.

One purpose of tuning the dynamic coupling of the turbofan engine(s) 10 is to adjust the natural frequency of the rotor 11, so that natural frequencies may be outside of a predetermined range frequencies. This may reduce, for instance, the likelihood that the rotor 11 will resonate, thereby reducing the vibratory stress experienced by the rotor 11. Such purpose is different than when the objective is to balance the rotor 11. One objective in balancing a rotor 11 is to align the actual axis of rotation with the desired axis of rotation, whereas the goal of tuning a rotor 11 is to adjust its natural frequency. Rotor balancing is about removing or reducing rotor eccentricities. These eccentricities cause vibration in the engine 10 as a whole, but have little to no effect on the natural frequency(ies) of the rotor 11. The purpose of weight balancing a rotor 11 is to align the actual rotor axis (i.e. its inertial axis) to the physical centerline of the rotor 11. The misalignment in the actual versus desired axis causes an imbalance. This imbalance manifests itself as a vibration which occurs with each revolution of the rotor 11. Reducing these vibrations is not considered, by those skilled in the art, to be the same as tuning the rotor 11.

Figure 3:
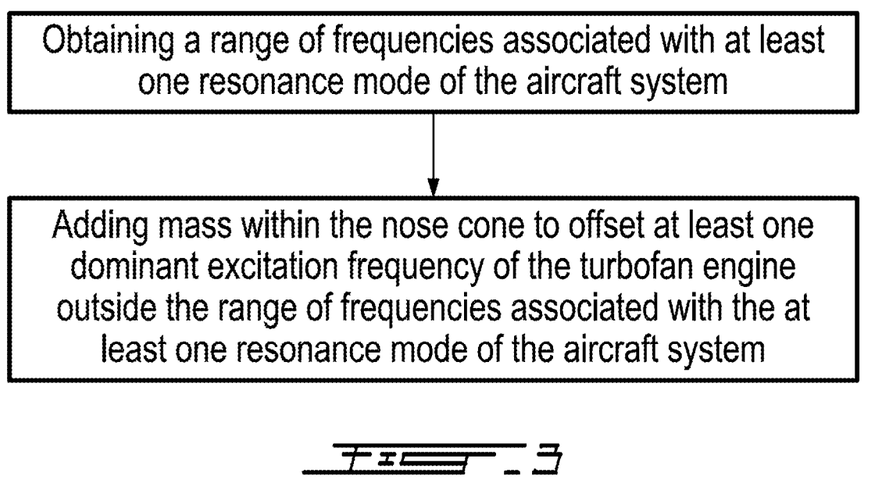
FIG. 3 is a block diagram illustrating an exemplary method for tuning engine/aircraft resonances, involving turbofan engines such as shown in FIG. 1.

Referring to FIG. 3, a method for tuning a vibratory response of an aircraft system 1 is represented. As shown, the method is applied to an aircraft system 1 that includes an airframe 2 and at least one turbofan engine 10 mounted thereto. The turbofan engine 10 has an engine rotor 11 which includes a nose cone 20. A range of frequencies (or a frequency) associated with at least one resonance mode of the aircraft system 1 is obtained. Mass is added in the nose cone to offset at least one dominant excitation frequency of the turbofan engine 10 outside the range of frequencies associated with the at least one resonance mode of the aircraft system 1.

Figure 4:
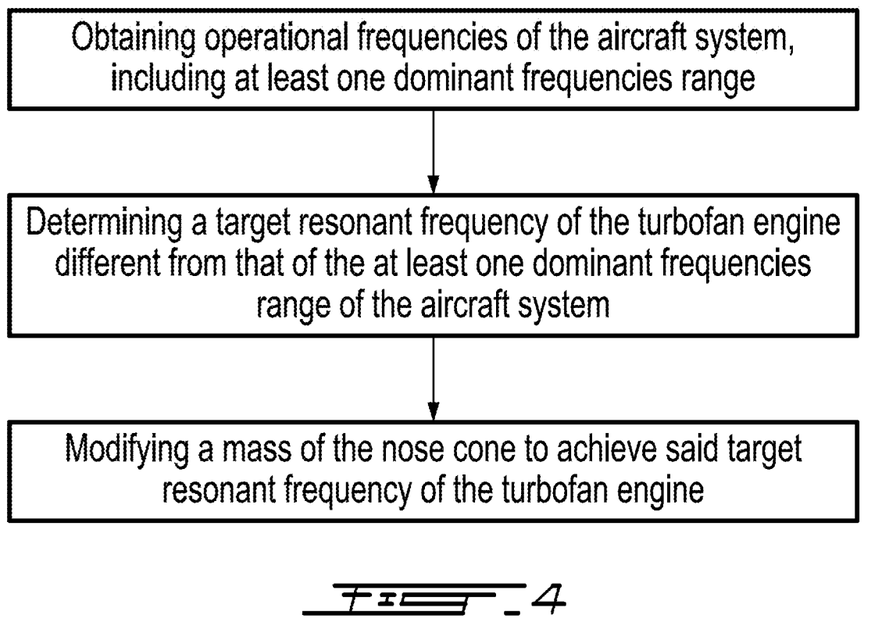
FIG. 4 is a block diagram illustrating another exemplary method for tuning dynamic coupling of an aircraft system, involving turbofan engines such as shown in FIG. 1.

Referring to FIG. 4, a method of tuning dynamic coupling of an aircraft system 1 comprising an airframe 2 and a turbofan engine 10 mounted thereto. As shown, the method is applied, similarly to what is represented in FIG. 3, to an aircraft system 1 comprising an airframe 2 and a turbofan engine 10 mounted thereto, the turbofan engine 10 having an engine rotor 11 including a nose cone. The method includes obtaining operational frequencies of the aircraft system 1, including one or more dominant frequencies ranges; determining a target resonant frequency of the turbofan engine 10 different from that of the one or more dominant frequencies ranges of the aircraft system 1; and modifying a mass of the nose cone to achieve said target resonant frequency of the turbofan engine 10.

Depending on the embodiments, adding mass in the nose cone may include different nose cone cavity 24 shapes, volumes, and/or geometries and/or weight distribution. Various embodiments of the nose cone with added mass are discussed later below. As will become apparent from the description of these various embodiments, in some cases adding mass includes evenly distributing said added mass about the rotation axis of the engine rotor 11 within a volume of the nose cone.

In some embodiments, adding mass may include obtaining an axially decreasing weight distribution of the nose cone such that weight of the nose cone is greater from the nose cone apex to an axial plane PA of the nose cone between the nose cone apex and the axial end of the nose cone than from said axial plane PA to the axial end. In a particular embodiment, said axial plane PA is located at an axial distance X1 from the apex corresponding to at least ⅓ but less than ⅔ of an overall length of the nose cone extending from the apex to the axial end of the nose cone, and obtaining the axially decreasing weight distribution of the nose cone includes distributing the weight of the nose cone such that the weight of the nose cone between the apex and the axial plane PA accounts for a majority of the weight of the nose cone. In some cases, obtaining the axially decreasing weight distribution of the nose cone includes distributing the weight of the nose cone such that the weight of the nose cone between the apex and the axial plane PA accounts for between about 50% to about 80% of the weight of the nose cone. In some cases, obtaining the axially decreasing weight distribution of the nose cone includes distributing the weight of the nose cone such that the weight of the nose cone between the apex and the axial plane PA accounts is more than two times but less than three times the weight of the nose cone between the axial plane PA and the axial end of the nose cone. Other weight distributions may be contemplated in other embodiments, so long as the weight distribution of the nose cone allows for having the most weight at the most forward location relative to the fan 12 (or fan blades 12A).

Figure 5:
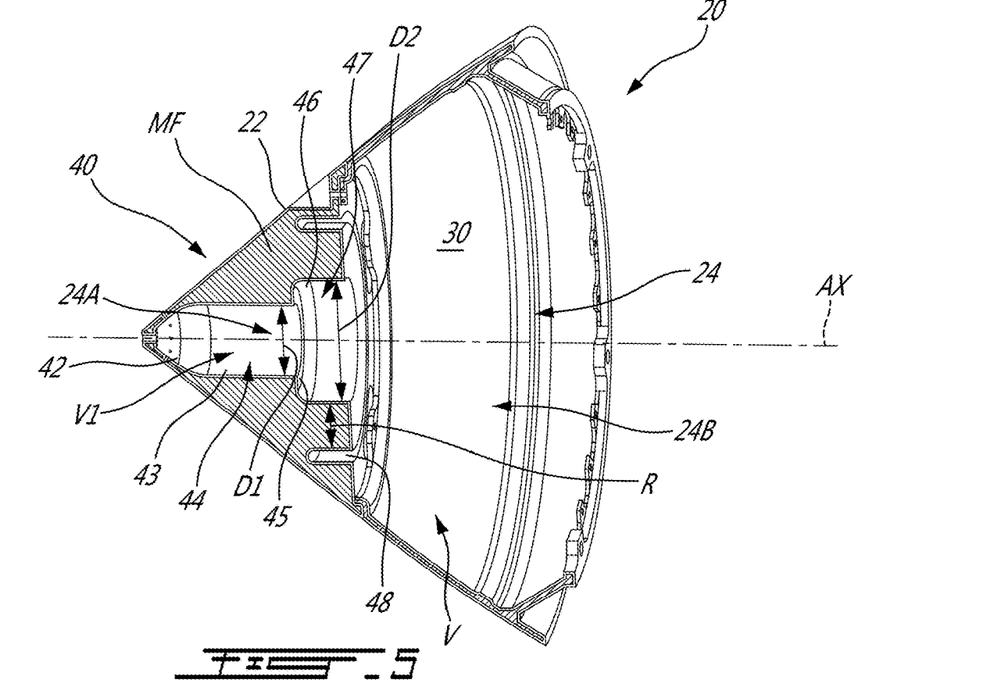
FIG. 5 is a cross-sectional perspective view of an exemplary nose cone as used for tuning engine/aircraft resonances of turbofan engines such as shown in FIG. 1.

Referring to FIG. 5, an exemplary nose cone 20 with added mass is shown. In the depicted embodiment, the nose cone 20 shares similar features as those discussed above and therefore such features will not be described again.

In the depicted embodiment, the nose cone 20 has an added mass defined at a frontmost portion thereof. The volume of the nose cone cavity 24 is reduced when compared to the embodiment shown in FIG. 2. As such, in such embodiment, adding mass includes forming an annular mass within a volume of the nose cone, the annular mass defining an internal cavity 24 of the nose cone. More particularly, in the depicted embodiment, a substantial portion of the overall volume V1 of the tip section 40 of the nose cone 20 is filled with material MF. Such material MF may be foam, such as a metallic foam as one possibility, titanium, aluminium as other possibilities. Other materials, including other types of materials, may be contemplated in other embodiments.

In the depicted embodiment, the filling material MF may be of the same material than that of the outer wall 22 of the nose cone 20. In the embodiment shown, the filling material MF is integral with the outer wall 22 of the nose cone 20. In other words, the outer wall 22, rather than being thin over a substantial portion of the tip section 40 such as to define a nose cone shell, forms a solid or thick structure having an irregular cross-sectional shape. Other configurations of the nose cone 20 may be contemplated, where, for instance, the outer wall 22 circumscribing the volume V of the nose cone 20 may be made of a different material than the filling material MF located within the volume V of the nose cone 20, radially inwardly from the outer surface 23 of the nose cone 20.

A first portion 24A of the nose cone cavity 24 may be circumscribed by the outer wall 22 portion forming the tip section 40 of the nose cone 20, whereas a second portion 24B of the nose cone cavity 24 may be circumscribed by the outer wall 22 portion forming the base section 30 of the nose cone 20. In other words, a portion 24A of the nose cone cavity 24 may be within the volume of the tip section 40, and another portion 24B of the nose cone cavity 24 may be within the volume of the base section 30 of the nose cone 20. While the portion 24B of the nose cone cavity 24 of FIG. 5 is substantially similar to the one shown in FIG. 2, differences are visible with respect to the portion 24A of the nose cone cavity 20. With continued reference to FIG. 5, the portion 24A of the nose cone cavity 20 in the tip section 40 defines a bullet-shaped feature. In other words, the portion 24A of the nose cone cavity 24 is surrounded by the filling material MF in the tip section 40, where the filling material MF defines the portion 24A of the nose cone cavity 24. In the embodiment shown, when viewed in a cross-section taken along the central axis AX of the nose cone 20 (see FIG. 5), the portion 24A has a bullet-like shape. Other shapes may be contemplated in other embodiments.

More particularly, in the embodiment shown, a foremost area of the portion 24A defines an internal dome surface 42, which may also be referred to as an hemispherical surface. The internal dome surface 42 extends towards and merges into a first tubular surface 43, here a cylindrical surface, such as to form a continuous surface therebetween, with such first tubular surface 43 extending about the central axis AX of the nose cone 20. As such, forming the annular mass within the nose cone may include defining an internal dome surface 42 in a foremost volume of the nose cone 20, extending towards and merging into a tubular surface 43 such as to form a continuous surface therebetween, with the tubular surface 43 extending about the central axis AX of the nose cone 20, where the central axis AX coincides with the rotation axis RA of the engine rotor 11.

The first tubular surface 43 defines a tubular section 44, here in the form of a cylinder having a diameter D1. The first tubular surface 43 extends axially from the dome surface 42 to a shoulder 45, the shoulder 45 defining an axial junction between the first tubular surface 43 and a second tubular surface 46. The tubular section 44 may be referred to as a first tubular section, with the second tubular surface 46 defining a second tubular section 47, here in the form of a cylinder having a diameter D2 greater than the diameter D1. In other words, the first tubular section 44 and the second tubular section 47 are concentric with one another, both extending along the central axis AX of the nose cone 20. As such, forming the annular mass may include forming a second tubular surface extending about the central axis of the nose cone, the first and second tubular surfaces being concentric with one another. The first tubular section 44 and the second tubular section 47 merge into one another, thereby forming the shoulder 45 as a consequence of the difference in diameters D1, D2. While in the embodiment shown the shoulder 45 extends radially normal to the central axis AX of the nose cone 20, the shoulder 45 may be configured differently in other embodiments. Other geometries may be contemplated for the portion 24A of the nose cone cavity 24. For instance, there may be more or less tubular section(s) and/or cross-section(s) of the tubular section(s) may be different, such as square, hexagonal, or other geometrical shapes.

In the embodiment shown, the tip section 40 has an annular channel 48 defined therein, about at least part of the portion 24A of the nose cone cavity 20, shown herein about the second tubular section 47 at a radial distance R thereof. In other words, part of the filling material M is defined between the second tubular section 47 and the annular channel 48.

Figure 6:
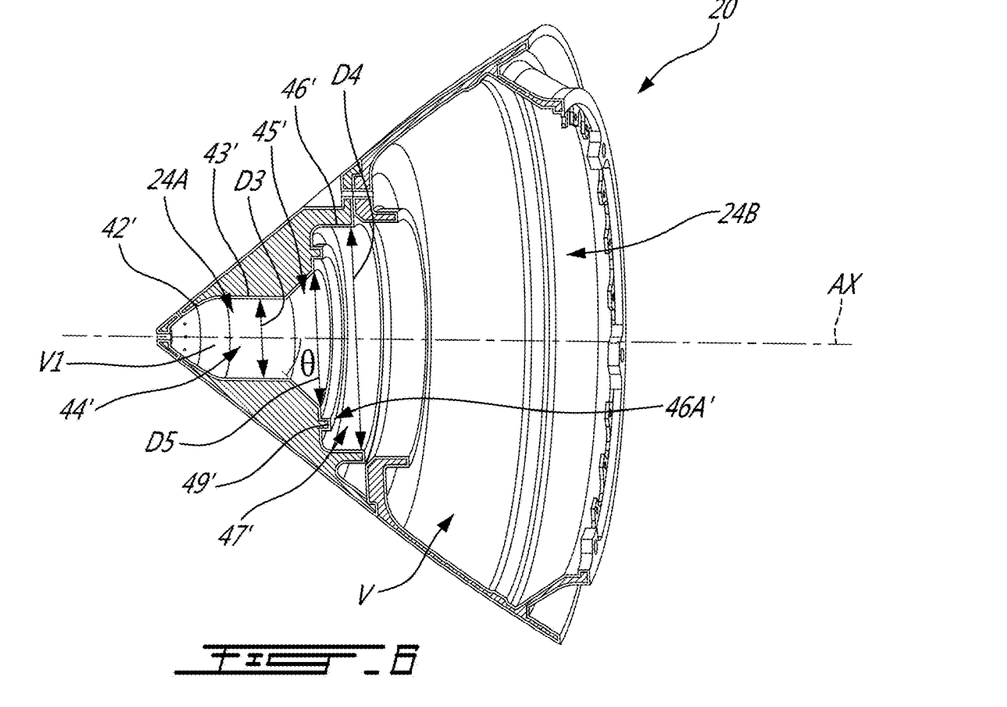
FIG. 6 is a cross-sectional perspective view of another exemplary nose cone as used for tuning engine/aircraft resonances of turbofan engines such as shown in FIG. 1.

Referring to FIG. 6, there is shown another exemplary nose cone 20, with similar features to those discussed above with respect to other embodiments, and therefore similar features will not be described again hereinafter. In the depicted embodiment of FIG. 6, the portion 24A of the nose cone cavity defines a bullet-shaped feature, with a first and a second tubular section 44', 47' extending along the central axis AX and coaxial with one another. The domed surface 42' extends towards and merges into the first tubular surface 43', with the first tubular surface 43' defining the first tubular section 44' having a diameter D3. The second tubular surface 46' defines the second tubular section 47'.

In the depicted embodiment, the first tubular section 44' extends toward the shoulder 45'. As shown, the shoulder 45' defines the junction between the first tubular section 44' and the second tubular section 47'. The shoulder 45' extends at an angle relative to the central axis AX of the nose cone 20. The shoulder 45' has a flared shape, such that the diameter of the shoulder 45' increases toward the second tubular section 47'. The second tubular section 47' has a diameter D4 greater than the diameter D3 of the first tubular section 44'. In the embodiment shown, the shoulder 45' does not transition directly from the first tubular surface 43' to the second tubular surface 46', or stated differently, from the diameter D3 to the diameter D4. As shown, a diameter D5 of the shoulder 45' at the junction with the second tubular section 47' is smaller than the diameter D4, where the diameter D4 is taken at the largest diameter of the second tubular section 47'. An axial surface 46A' extending circumferentially at an end of the second tubular section 47' extends between the shoulder 45' and the second tubular surface 46'. The axial surface 46A' may thus allow the transition between the shoulder 45' and the second tubular surface 46'. The axial surface 46A' defines a rib 49' extending about the central axis AX of the nose cone 20. In the depicted embodiment, the rib 49' is an annular rib extending along the full circumference of the axial surface 46A'. The rib 49' may be absent in other embodiments (such as in the embodiment shown in FIG. 5).

The bullet-shaped features described above may vary in shape in other embodiments. For instance, the diameters D1, D2, D3, D4 and/or D5 may vary in other embodiments, and/or more or less filling material M may be included within the volume V of the nose cone 20. In other words, the filling material MF may fill a greater or lesser volume V of the nose cone 20/a greater or lesser volume V1 of the tip section 40 of the nose cone 20. In some embodiments, the bullet-shaped features may advantageously be easier to manufacture than other geometries, and/or they may allow optimization of the weight distribution within the nose cone 20. While the embodiments of FIGS. 3-4 have similar bullet-shaped portion 24A of the nose cone cavity 24, alternative designs and various geometrical shapes may be contemplated in other embodiments.

In some embodiments, the filling material M providing added mass to the nose cone 20 may be obtained by manufacturing the tip section 40 from a plain block of material, by any suitable material removal techniques, such as machining, for example. The tip section 40 of the nose cone 20 may be manufactured using any suitable material additive manufacturing techniques, such as 3D-printing, for instance.

Adding mass to the nose cone 20 includes distributing a weight of the nose cone 20 with a weight of the tip section 40 accounting for a majority of the weight of the nose cone 20. This may be obtained by forming the nose cone 20, and/or more particularly the tip section 40 thereof as described above with respect to various embodiments of the nose cone 20. In an embodiment, a weight distribution of the nose cone 20 is such that the tip section 40 is heavier than the base section.

A method for tuning a dynamic coupling of an airframe 2 and turbofan engine 10 of an aircraft system 1 may be drawn from the above, according to another possibility. Said method may be implemented using the various embodiments discussed above. The turbofan engine 10 has an engine rotor 11 including a shaft and a baseline nose cone removably attached to the fan. In some embodiments, the nose cone 20 is such as the one discussed above with respect to FIG. 2. An aircraft system 1 vibration response is obtained, the aircraft system 1 vibratory response defining a range of operational frequencies of the aircraft system 1. The baseline nose cone is then removed (removed or disassembled) from the fan of the turbofan engine 10 and a tuned nose cone is mounted to the fan in place of the baseline nose cone. Said tuned nose cone 20 may be in accordance with the embodiments discussed with respect to FIGS. 5 and 6. The tuned nose cone thus have a greater weight than that of the baseline nose cone or a mass distribution different from that of the baseline nose cone. In some cases, for instance in embodiments where the nose cone 20 is made of a tip section 30 and a base section 40 as discussed above, instead of removing the whole baseline nose cone and replacing the baseline nose cone with a tuned nose cone, only one portion of the nose cone 20 may be removed, such as the tip section 40, which for consistency with the present disclosure may be referred to as a baseline tip section, and replaced by a tuned tip section 40 having a mass greater than that of the baseline tip section 40 or a mass distribution different from that of the baseline tip section 40. As such, in some embodiments, adding mass in the nose cone may include providing a tuned tip portion having a weight greater than that of the tip portion, the tuned tip portion adapted to replace the tip portion in place and connect to the remainder of the nose cone. In some embodiments, where the nose cone is formed of at least two separate parts removably connected to one another, a first one of the separate parts defining a tip portion (or section 40) of the nose cone and a second one of the separate parts defining a base portion (or section 30), the tip portion defining an apex of the nose cone, the base portion extending from the tip portion to an axial end of the nose cone, adding mass in the nose cone includes providing a tuned tip portion having a weight greater than that of the tip portion in place, or a tuned tip portion having a different weight distribution than the tip portion in place.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for tuning a vibratory response of an aircraft system comprising an airframe and at least one turbofan engine dynamically coupled, the at least one turbofan engine having an engine rotor including a nose cone, the method comprising:
   obtaining a range of frequencies associated with at least one resonance mode of the aircraft system; and
   adding mass within the nose cone to offset at least one dominant excitation frequency of the turbofan engine outside the range of frequencies associated with the at least one resonance mode of the aircraft system.

2. The method as defined in claim 1, further comprising determining a range of excitation frequencies of the turbofan engine prior to adding mass in the nose cone.

3. The method as defined in claim 1, further comprising evaluating the vibratory response of the aircraft system after adding the mass in the nose cone.

4. The method as defined in claim 1, wherein the engine rotor is mounted for rotation about a rotation axis, wherein adding mass includes evenly distributing said added mass about the rotation axis of the engine rotor within a volume of the nose cone, the volume circumscribed by an outer surface of the nose cone.

5. The method as defined in claim 1, wherein the nose cone defines an apex and an axial end of the nose cone, wherein adding mass includes obtaining an axially decreasing weight distribution of the nose cone such that a weight of the nose cone is greater from the apex to an axial plane of the nose cone between the apex and the axial end of the nose cone than from said axial plane to the axial end of the nose cone.

6. The method as defined in claim 5, wherein the axial plane is located at an axial distance from the apex corresponding to at least ⅓ but less than ⅔ of an overall length of the nose cone extending from the apex to the axial end of the nose cone, wherein obtaining the axially decreasing weight distribution of the nose cone includes distributing the weight of the nose cone such that the weight of the nose cone between the apex and the axial plane accounts for a majority of the weight of the nose cone.

7. The method as defined in claim 5, wherein the axial plane is located at an axial distance from the apex corresponding to at least ⅓ but less than ⅔ of an overall length of the nose cone extending from the apex to the axial end of the nose cone, wherein obtaining the axially decreasing weight distribution of the nose cone includes distributing the weight of the nose cone such that the weight of the nose cone between the apex and the axial plane accounts for between about 50% to about 80% of the weight of the nose cone.

8. The method as defined in claim 5, wherein the axial plane is located at an axial distance from the apex corresponding to at least ⅓ but less than ⅔ of an overall length of the nose cone extending from the apex to the axial end of the nose cone, wherein obtaining the axially decreasing weight distribution of the nose cone includes distributing the weight of the nose cone such that the weight of the nose cone between the apex and the axial plane accounts is more than two times but less than three times the weight of the nose cone between the axial plane and the axial end of the nose cone.

9. The method as defined in claim 1, wherein adding mass includes forming an annular mass within a volume of the nose cone, the annular mass defining an internal cavity of the nose cone.

10. The method as defined in claim 9, wherein forming the annular mass includes defining an internal dome surface at a foremost area of the nose cone, extending towards and merging into a tubular surface such as to form a continuous surface therebetween, the tubular surface extending about a central axis of the nose cone, the central axis coinciding with the rotation axis of the engine rotor.

11. The method as defined in claim 10, wherein the tubular surface is a first tubular surface, wherein forming the annular mass includes forming a second tubular surface extending about the central axis of the nose cone, the first and second tubular surfaces being concentric with one another.

12. The method as defined in claim 1, wherein the nose cone has a tip portion defining an apex of the nose cone and extending axially along a central axis of the nose cone over at least one third of a total length of the nose cone, the tip portion removably connected to a remainder of the nose cone, wherein adding mass in the nose cone includes providing a tuned tip portion having a weight greater than that of the tip portion, the tuned tip portion adapted to replace the tip portion in place and connect to the remainder of the nose cone.

13. The method as defined in claim 1, wherein the nose cone is formed of at least two separate parts removably connected to one another, a first one of the separate parts defining a tip portion of the nose cone and a second one of the separate parts defining a base portion, the tip portion defining an apex of the nose cone, the base portion extending from the tip portion to an axial end of the nose cone, wherein adding mass in the nose cone includes providing a tuned tip portion having a weight greater than that of the tip portion in place, the tuned tip portion adapted to connect to the base portion of the nose cone.

14. A method of tuning dynamic coupling of an aircraft system comprising an airframe and a turbofan engine mounted thereto, the turbofan engine having an engine rotor including a nose cone, the method comprising:
  obtaining operational frequencies of the aircraft system, including at least one dominant frequencies range;
  determining a target resonant frequency of the turbofan engine different from that of the at least one dominant frequencies range of the aircraft system; and
  modifying a mass of the nose cone to achieve said target resonant frequency of the turbofan engine.

15. The method as defined in claim 14, wherein tuning the mass of the nose cone includes forming an annular mass within a volume of the nose cone, the annular mass defining an internal cavity of the nose cone.

16. The method as defined in claim 15, wherein forming the annular mass includes defining an internal dome surface at a foremost area of the nose cone, extending towards and merging into a tubular surface such as to form a continuous surface therebetween, the tubular surface extending about a central axis of the nose cone, the central axis coinciding with the rotation axis of the engine rotor.

17. The method as defined in claim 14, wherein the engine rotor is mounted for rotation about a rotation axis, wherein tuning the mass includes adding the mass such as to evenly distribute said added mass about the rotation axis of the engine rotor within a volume of the nose cone, the volume circumscribed by an outer surface of the nose cone.

18. The method as defined in claim 14, wherein the nose cone defines an apex and an axial end of the nose cone, wherein tuning the mass includes obtaining an axially decreasing weight distribution of the nose cone such that a weight of the nose cone is greater from the apex to an axial plane of the nose cone between the apex and the axial end of the nose cone than from said axial plane to the axial end of the nose cone.

19. The method as defined in claim 18, wherein the axial plane is located at an axial distance from the apex corresponding to at least ⅓ but less than ⅔ of an overall length of the nose cone extending from the apex to the axial end of the nose cone, wherein obtaining the axially decreasing weight distribution of the nose cone includes distributing the weight of the nose cone such that the weight of the nose cone between the apex and the axial plane accounts for between about 50% to about 80% of the weight of the nose cone.

20. A method for tuning a dynamic coupling of an airframe and a turbofan engine of an aircraft system, the turbofan engine mounted to the airframe, the turbofan engine having at least one resonant frequency, the method comprising:
  obtaining an aircraft system vibratory response, the aircraft system vibratory response defining a range of operational frequencies of the aircraft system, the turbofan engine having a fan and a baseline nose cone removably attached thereto;

removing the baseline nose cone from the fan of the turbofan engine; and mounting a tuned nose cone to the fan of the turbofan engine in place of the baseline nose cone, the tuned nose cone having a mass greater than that of the baseline nose cone or a mass distribution different from that of the baseline nose cone to modify the at least one resonant frequency.

* * * * *